April 29, 1941.          S. ANDERSON          2,240,237
POTATO MASHER AND FLUFFER
Filed April 3, 1939
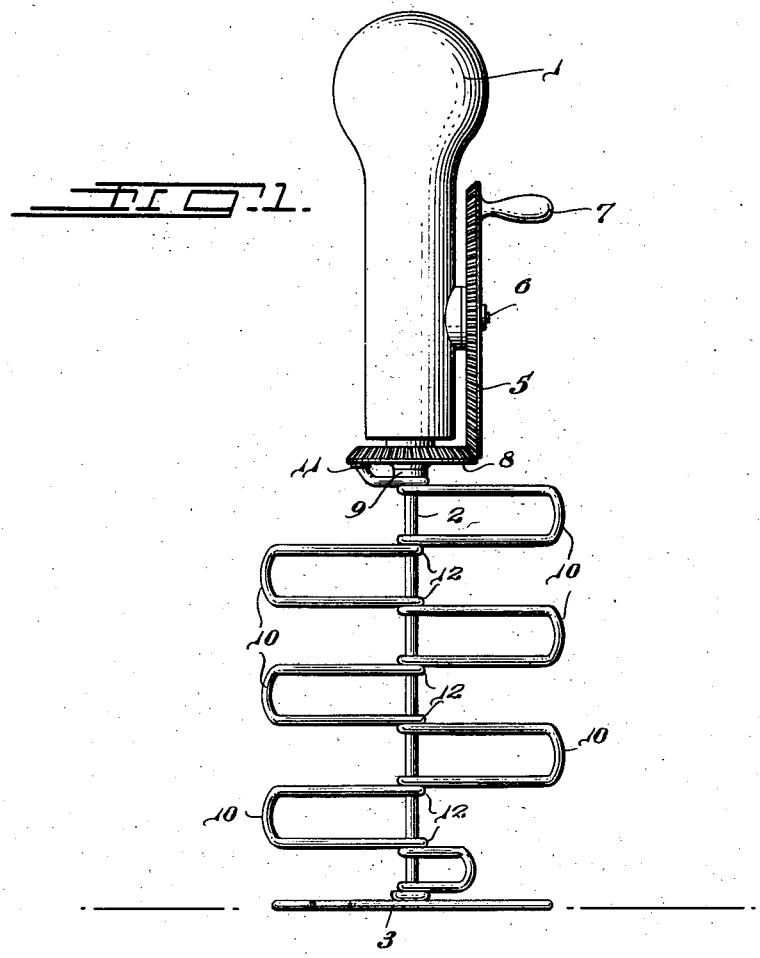
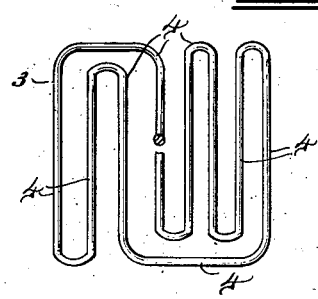
Inventor
Selma Anderson
by [signature]
Atty Patented Apr. 29, 1941

2,240,237

UNITED STATES PATENT OFFICE 2,240,237

POTATO MASHER AND FLUFFER

Selma Anderson, Tacoma, Wash.

Application April 3, 1939, Serial No. 265,732

1 Claim. (Cl. 259—135)

This invention relates to kitchen tools and especially to the tools commonly known as potato mashers, and has for its object to improve the said masher by combining therewith a fluffing mechanism, or beater, whereby both operations usually performed in consecutive order, may be carried on at the same time, thereby not only saving the time of performing the operations separately but each operation will shorten the time of the other.

I attain these and other objects by the devices, mechanisms, and arrangements illustrated in the accompanying drawing, in which—Fig. 1 is an elevation of my improved tool, and Fig. 2 is a plan view of the masher portion thereof, alone.

Similar numerals of reference refer to similar parts throughout the several views.

My improved tool comprises a strong and substantial handle 1, fastened on the end of the stem 2, made of heavy wire, which extends straight down therefrom to the masher 3.

This masher 3 comprises the same wire as the stem 2, bent to provide a horizontal grill or a series of parallel spaced bars 4 adapted to mash the potatoes. I prefer to bring the end of the said wire into close proximity to the stem 2, as shown.

The beater, or fluffer, portion of the tool comprises a driving gear wheel 5, mounted on the horizontal pin 6, secured in the handle 1, and provided with an operating handle 7. This gear 5 meshes with a smaller gear 8, journalled to turn on the said stem 2, and held in position by a collar 9 secured on the stem 2. The fluffer arms 10 comprise a continuous wire 11 bent to form said arms and looped at 12 around the stem 2, and the upper end of this wire 11 is fastened to the said small gear wheel 8. The entire beater therefore turns about the stem 2 when the gears 5 and 8 are operated.

Thus it will be seen that the stem 2 forms the center of rotation of the fluffer arms 10 as well as being the stem for the masher 3, and that the fluffer may be rotated at the same time that the masher is operated and acts on the partially mashed potato as it passes upward between the bars 4 of the masher grill, thus coacting with the masher to speed up the finished product. The action of the fluffer on the mashed potato as it passes upward is a combination of a fluffing action with a further mashing action.

It is, of course, understood that my invention may be modified or varied in many respects without departing from the spirit thereof as outlined in the appended claim, and that the words and terms used in the specification and claim are to be given their most generic meaning permitted by the state of the art at the present time.

Having, therefore described my invention, what I claim, and desire to secure by Letters Patent, is:

An article of the class described, comprising a vertical handle, having a knob at its upper end; a single fixed stem extending centrally down therefrom; a fluffer comprising a unitary wire looped at intervals around said stem and extending laterally therefrom between said loops to form fluffing arms; means for rotating said fluffer on said stem; and a horizontal masher integral with said stem and centrally arranged on the lower end thereof and coacting with said fluffer to hold said fluffer in engagement with said rotating means.

SELMA ANDERSON.